United States Patent
Fan et al.

(10) Patent No.: US 12,524,068 B2
(45) Date of Patent: Jan. 13, 2026

(54) PICTURE RENDERING METHOD AND APPARATUS

(71) Applicant: Beijing Zitiao Network Technology Co., Ltd., Beijing (CN)

(72) Inventors: Yunfei Fan, Beijing (CN); Guidong Wang, Beijing (CN); Tao Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/619,458

(22) Filed: Mar. 28, 2024

(65) Prior Publication Data

US 2024/0329730 A1    Oct. 3, 2024

(30) Foreign Application Priority Data

Mar. 28, 2023  (CN) .......................... 202310315799.2

(51) Int. Cl.
| | | |
|---|---|---|
| *G06F 3/01* | (2006.01) | |
| *G06F 3/0346* | (2013.01) | |
| *G06F 3/147* | (2006.01) | |

(52) U.S. Cl.
CPC ............ *G06F 3/012* (2013.01); *G06F 3/0346* (2013.01); *G06F 3/147* (2013.01)

(58) Field of Classification Search
CPC ........ G06F 3/012; G06F 3/0346; G06F 3/147; G06F 3/011; G06F 2203/012; G06T 15/005

See application file for complete search history.

(56) References Cited

U.S. PATENT DOCUMENTS

| | | | | |
|---|---|---|---|---|
| 9,495,801 B2 * | 11/2016 | Ebstyne | ................ | G06T 19/006 |
| 11,315,326 B2 * | 4/2022 | Xu | ........................ | G02B 27/017 |

(Continued)

FOREIGN PATENT DOCUMENTS

| | | |
|---|---|---|
| CN | 111352506 A | 6/2020 |
| CN | 112486318 A | 3/2021 |
| WO | 2021/178980 A1 | 9/2021 |

OTHER PUBLICATIONS

European Search Report for EP Patent Application No. 24167505.7, Issued on Aug. 29, 2024, 9 pages.

(Continued)

*Primary Examiner* — Benyam Ketema (57) ABSTRACT

The present disclosure provides a picture rendering method and apparatus, the method comprising: determining a plurality of predicted moments after a current moment, wherein the plurality of predicted moments comprise a plurality of intermediate moments and a display moment after the plurality of intermediate moments; inputting the plurality of predicted moments into a pre-trained prediction model for prediction processing to obtain a plurality of predicted inertial measurement data that correspond to the predicted moments on a one-to-one basis; obtaining a current pose and a current speed of the head-mounted display device, and determining a display pose at the display moment based on the current pose, the current speed and the plurality of predicted inertial measurement data; and rendering a virtual scene based on the display pose to obtain a display picture corresponding to the display moment.

20 Claims, 3 Drawing Sheets

(56) References Cited

U.S. PATENT DOCUMENTS

| | | | | |
|---|---|---|---|---|
| 11,353,700 B2* | 6/2022 | Sugiarto | ............... | G06F 1/163 |
| 12,073,521 B2* | 8/2024 | Challapalli | ........... | G06T 19/006 |
| 12,148,120 B2* | 11/2024 | Mironov | ............... | G06F 3/012 |
| 12,165,351 B2* | 12/2024 | Ju | ......................... | G06T 7/248 |
| 2019/0340435 A1* | 11/2019 | Rabinovich | ......... | G06V 10/764 |
| 2020/0132996 A1* | 4/2020 | Yokota | ................... | G06F 3/013 |
| 2021/0055545 A1* | 2/2021 | Rodgers | ............ | G01C 21/1656 |
| 2022/0122516 A1* | 4/2022 | Kuwahara | ............ | G09G 3/2096 |
| 2022/0237949 A1* | 7/2022 | Kim | ...................... | G06V 40/20 |
| 2023/0177778 A1* | 6/2023 | Rahman | ............... | G06T 19/006 |
| | | | | 345/633 |
| 2023/0214027 A1* | 7/2023 | Erivantcev | ............. | G06F 3/017 |
| | | | | 345/156 |

OTHER PUBLICATIONS

Communication pursuant to Rules 70(2) and 70a(2) EPC and reference to Rule 39(1) EPC for European Application No. 24167505.7, mailed Oct. 8, 2024, 2 pages.

* cited by examiner

PICTURE RENDERING METHOD AND APPARATUS

CROSS REFERENCE TO RELATED APPLICATIONS

This application claims the benefit of priority to Chinese Application No. 202310315799.2, filed on Mar. 28, 2023, the entire contents of which are incorporated herein by reference.

TECHNICAL FIELD

Embodiments of the present disclosure relate to the field of image processing, in particular to a picture rendering method and apparatus.

BACKGROUND

XR (Extended Reality) devices include: VR (Virtual Reality) devices, AR (Augmented Reality) devices, and MR (Mixed Reality) devices. Herein, users view the pictures rendered and displayed by the XR devices by wearing the XR devices on their head.

In actual use, the XR devices have to render image data in advance in order to display it normally at a corresponding display moment.

SUMMARY

Embodiments of the present disclosure provide a picture rendering method and apparatus.

In a first aspect, an embodiment of the present disclosure provides a picture rendering method, which is applied to a head-mounted display device, the picture rendering method comprising: determining a plurality of predicted moments after a current moment, wherein the plurality of predicted moments comprise a plurality of intermediate moments and a display moment after the plurality of intermediate moments; inputting the plurality of predicted moments into a pre-trained prediction model for prediction processing to obtain a plurality of predicted inertial measurement data that correspond to the predicted moments on a one-to-one basis; obtaining a current pose and a current speed of the head-mounted display device, and determining a display pose at the display moment based on the current pose, the current speed and the plurality of predicted inertial measurement data; rendering a virtual scene based on the display pose to obtain a display picture corresponding to the display moment.

In a second aspect, an embodiment of the present disclosure provides a picture rendering apparatus, comprising: a first determining unit configured to determine a plurality of predicted moments after a current moment, wherein the plurality of predicted moments comprise a plurality of intermediate moments and a display moment after the plurality of intermediate moments;
 a processing unit configured to input the plurality of predicted moments into a pre-trained prediction model for prediction processing to obtain a plurality of predicted inertial measurement data that correspond to the predicted moments on a one-to-one basis;
 a second determining unit configured to obtain a current pose and a current speed of a head-mounted display device and determine a display pose at the display moment based on the current pose, the current speed and the plurality of predicted inertial measurement data; and
 a rendering unit configured to render a virtual scene based on the display pose to obtain a display picture corresponding to the display moment.

In a third aspect, an embodiment of the present disclosure provides an electronic apparatus, comprising: at least one processor and a memory;
 wherein the memory stores computer executable instructions; and
 wherein the at least one processor executes the computer executable instructions stored in the memory, causes the at least one processor to perform the picture rendering method as provided above in the first aspect.

In a fourth aspect, an embodiment of the present disclosure provides a computer-readable storage medium storing computer executable instructions thereon, which when executed by a processor implement the picture rendering method as provided above in the first aspect.

In a fifth aspect, according to one or more embodiments of the present disclosure, there is provided a computer program product that embodies computer executable instructions therein, which when executed by a processor implement the picture rendering method as provided above in the first aspect.

The picture rendering method and apparatus provided in the embodiments determine a plurality of predicted moments after a current moment, wherein the plurality of predicted moments comprise a plurality of intermediate moments and a display moment after the plurality of intermediate moments; input the plurality of predicted moments into a pre-trained prediction model for prediction processing to obtain a plurality of predicted inertial measurement data that correspond to the predicted moments on a one-to-one basis; obtain a current pose and a current speed of a head-mounted display device, and determine a display pose at the display moment based on the current pose, the current speed and the plurality of predicted inertial measurement data; and render a virtual scene based on the display pose to obtain a display picture corresponding to the display moment.

BRIEF DESCRIPTION OF THE DRAWINGS

In order to more clearly illustrate the technical solutions in the embodiments of the present disclosure or in the related art, the drawings that need to be used in the description of the embodiments or the related art will be briefly introduced below, and it is obvious that the drawings in the following description are some embodiments of the present disclosure, and those skilled in the art can obtain other drawings based on the following drawings without making any inventive effort.

DETAILED DESCRIPTION

To make the objects, technical solutions and advantages of the embodiments of the present disclosure more apparent, the technical solutions in the embodiments of the present disclosure will be described clearly and completely with reference to the drawings in the embodiments of the present disclosure, and it is obvious that the described embodiments are some, but not all embodiments of the present disclosure. All other embodiments, which can be derived by a person skilled in the art from the embodiments disclosed herein without making any inventive effort, shall fall within the protection scope of the present disclosure.

Obtaining pictures displayed on the screen of XR devices requires a large amount of high-load advance rendering. Herein, when a user is wearing an XR device on his or her head, since the user's head is always moving, it is necessary to render image data according to a pose of the user's head, thereby reducing the dizziness of the user viewing pictures. In addition, since the rendering process takes some time, it is necessary to render the image data in advance, but in the case of advance rendering, the XR device cannot detect the pose of the user's head at a future moment, and therefore the accuracy of the rendered pictures cannot be ensured.

In the related art, a predicted pose at a future moment is obtained based on a current pose at a current moment and current predicted inertial measurement data, and this method assumes that the predicted inertial measurement data at the future moment are the same as the current predicted inertial measurement data. However, in the case that the user is stationary at the current moment and moving at the future moment, the predicted pose obtained using this method is not accurate, further causing users to feel dizzy. Or, in the related art, image data to be displayed at a future moment is usually rendered using a pose at a current moment to obtain a display picture, and this method results in inaccurate rendering of the display picture, causing users to feel dizzy and affecting the user experience.

In view of the foregoing problem, the picture rendering method and apparatus provided in the present disclosure, by determining a plurality of predicted moments after a current moment, wherein the plurality of predicted moments comprise a plurality of intermediate moments and a display moment after the plurality of intermediate moments; inputting the plurality of predicted moments into a pre-trained prediction model for prediction processing to obtain a plurality of predicted inertial measurement data that correspond to the predicted moments on a one-to-one basis; obtaining a current pose and a current speed of a head-mounted display device, and determining a display pose at the display moment based on the current pose, the current speed and the plurality of predicted inertial measurement data; and rendering a virtual scene based on the display pose to obtain a display picture corresponding to the display moment, can accurately determine the display pose at the display moment, render the virtual scene based on the display pose and obtain the display picture that is accurately displayed at the display moment, thereby avoiding the dizziness of users when viewing pictures and improving the user experience, and overcoming the problem that an optical tracker has a low positioning accuracy.

Figure 1:
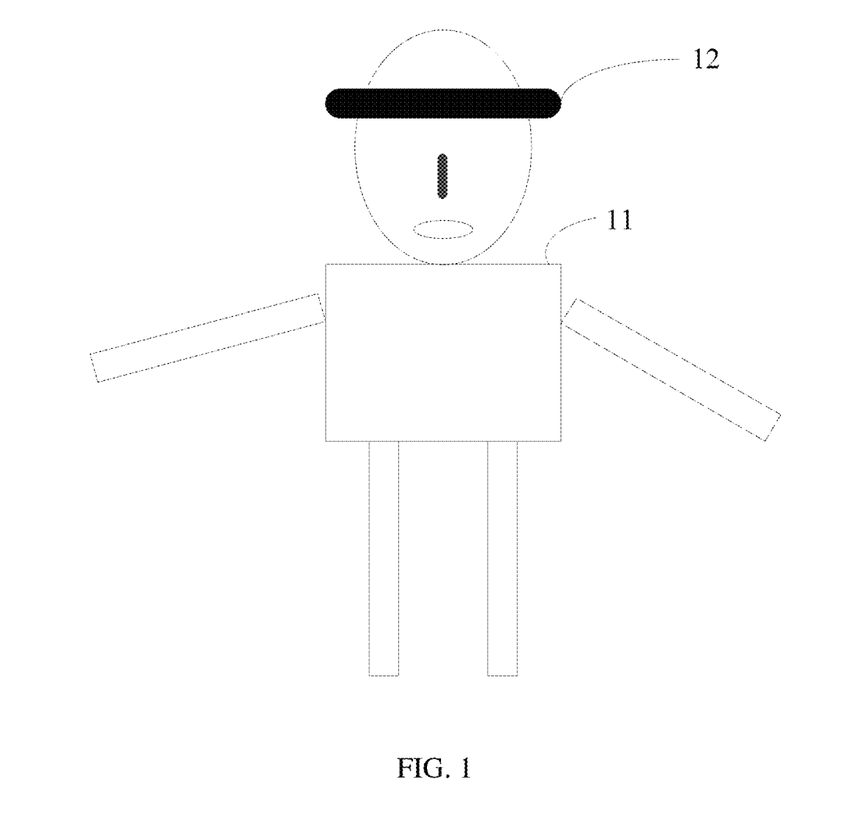
FIG. 1 is an exemplary diagram of an application scenario provided in an embodiment of the present disclosure.

Referring to FIG. 1, it is an exemplary diagram of an application scenario provided in an embodiment of the present disclosure. As shown in FIG. 1, there includes: a user 11 and a head-mounted display device 12, wherein the user 11 is wearing the head-mounted display device 12 on his or her head, and the head-mounted display device 12 can display pictures. As the user's head moves, the head-mounted display device 12 can obtain the pose of the user's head and predicted inertial measurement data (a linear acceleration and an angular acceleration of head movement).

The application scenario described above is only one of the scenario examples, and the embodiments of the present disclosure can be applied to any application scenarios of the head-mounted display device.

Figure 2:
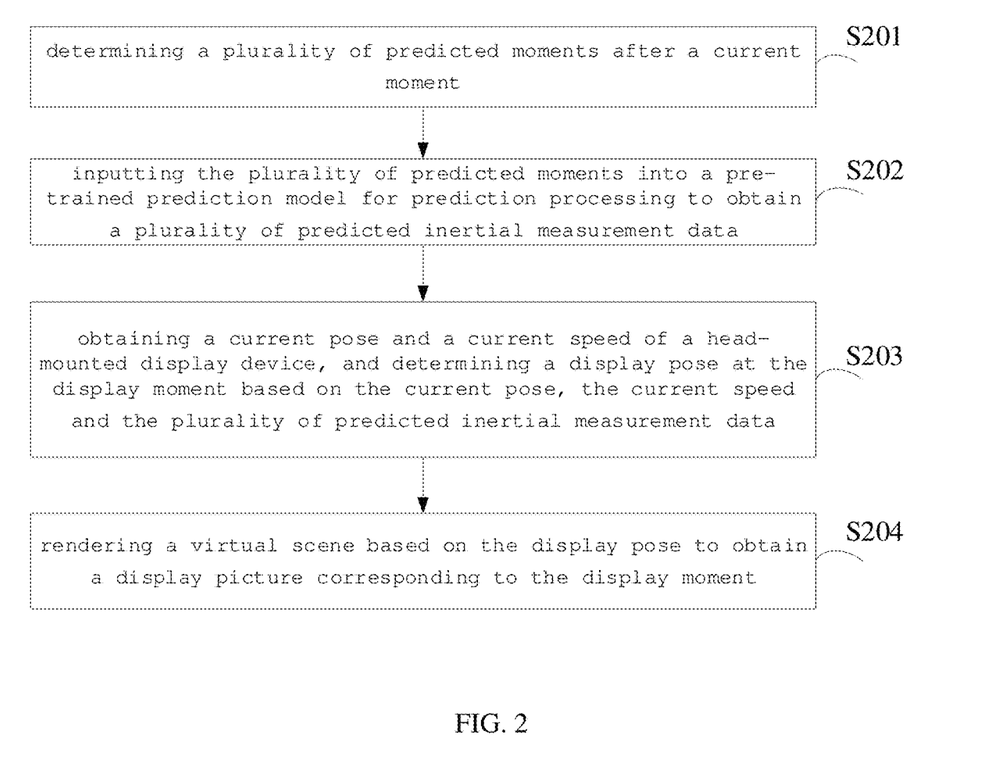
FIG. 2 is a flowchart illustrating the steps of a picture rendering method provided in an embodiment of the present disclosure.

Referring to FIG. 2, it is a flowchart of a picture rendering method provided in an embodiment of the present disclosure. As shown in FIG. 2, the picture rending method, which is applied to a head-mounted display device, specifically comprises the following steps:

S201: determining a plurality of predicted moments after a current moment.

In the present disclosure, the head-mounted display device is VR glasses for example.

Herein, the plurality of predicted moments comprise a plurality of intermediate moments and a display moment coming after the plurality of intermediate moments. The plurality of intermediate moments are between the current moment and the display moment, and the display moment is the last moment of the plurality of predicted moments.

In the present disclosure, for example, the current moment is 9:00, and then the plurality of predicted moments are 9:00+1 ms (millisecond), 9:00+2 ms, . . . , 9:00+30 ms, wherein the plurality of intermediate moments are 9:00+1 ms, 9:00+2 ms, . . . , 9:00+29 ms, and the display moment is 9:00+30 ms.

Herein, determining a plurality of predicted moments after the current moment comprises: obtaining a display moment; determining a plurality of intermediate moments between the current moment and the display moment.

Further, obtaining the display moment comprises: obtaining an interval duration between the display moment and the current moment; and determining the display moment based on a picture rendering duration and the current moment.

In the present disclosure, the display moment can be obtained first, that is, what is to be predicted currently is a pose at the display moment. Herein, the display moment may be determined in a preset way. Specifically, an interval duration of the advance rendering may be preset, and the current moment plus the interval duration is just the display moment. For example, when the interval duration is 30 ms, then the pose at the display moment (9:00+30 ms) is predicted at 9:00 (the current moment), the pose at the display moment (10:00+30 ms) is predicted at 10:00, and the pose at the display moment (11:00+30 ms) is predicted at 11:00. In addition, the display moment may also be determined in other ways, which are not limited herein.

Further, the plurality of intermediate moments between the current moment and the display moment may be determined according to a preset unit interval. A difference value between two adjacent intermediate moments is the preset unit interval, and a difference value between the earliest one of the intermediate moments and the current moment is also the preset unit interval. For example, the preset unit interval is 1 ms, 2 ms, or 3 ms, which is not limited herein. For example, when the current moment is 9:00 and the display moment is 9:00+30 ms, then the intermediate moments may be 9:00+1 ms, 9:00+2 ms, . . . , and 9:00+29 ms.

Herein, obtaining an interval duration between the display moment and the current moment comprises: determining a virtual scene type; and determining the interval duration according to the virtual scene type, wherein the virtual scene type and the interval duration have a preset correspondence.

Specifically, for different virtual scene types, picture rendering requires different durations, and the interval duration means that the rendering of a display picture after the interval duration starts from the current moment. For example, for scenes with a large amount of calculation such as complicated game scenes, since picture rendering requires a long duration, the rendering needs to be started early. For scenes with a low amount of calculation such as image browsing, since the duration of picture rendering is short, the rendering does not need to be started early. In the present disclosure, the correspondence between the interval duration and the virtual scene type may be set in advance, and for example, for game scenes, the corresponding interval duration is 50 ms. For video scenes, the corresponding interval duration is 30 ms. For image browsing scenes, the corresponding interval duration is 20 ms.

In an optional embodiment, obtaining the interval duration between the display moment and the current moment comprises: obtaining a picture display frame rate; and determining the interval duration according to the picture display frame rate, wherein the picture display frame rate and the interval duration are positively correlated.

In the present disclosure, the higher the frame rate, the larger the amount of calculation, the longer the duration of picture rendering, and thus the rendering needs to be started early. The lower the frame rate, the smaller the amount of calculation, the shorter the duration of picture rendering, and thus the rendering does not need to be started early. In the present disclosure, the correspondence between the picture display frame rate and the interval duration may be predetermined. For example: when the frame rate is more than 60 frames/second, the interval duration is 50 ms. When the frame rate is less than 60 frames/second and more than 30 frames/second, the interval duration is 35 ms. When the frame rate is less than 35 frames/second, the interval duration is 25 ms.

In an optional embodiment, obtaining the interval duration between the display moment and the current moment comprises: obtaining a historical picture rendering duration within a preset historical moment period; and determining the interval duration according to the historical picture rendering duration, wherein the interval duration is greater than or equal to the historical picture rendering duration.

Specifically, it may be determined that the interval duration is greater than or equal to an average historical picture rendering duration, and it may also be determined that the interval duration is greater than or equal to the longest historical picture rendering duration.

In an embodiment of the present application, the preset historical moment period may be 1 second, 2 seconds or the like. For example, if 30 frames of images are displayed within 1 second before the current moment, historical picture rendering durations of respective ones of the 30 frames of images are obtained, which are 30 historical picture rendering durations such as 20 ms, 23 ms, 19 ms, etc. If an average value of the 30 historical picture rendering durations is 21 ms, it may be determined that the interval duration is greater than the average value of 21 ms by, for example, a preset value, such as 2 ms, and then the interval duration is 23 ms. Optionally, if a maximum value of the 30 historical picture rendering durations is 28 ms, it may be determined that the interval duration is equal to the maximum value of 28 ms.

In the present disclosure, the interval duration may be default or determined in other ways, which are not limited herein. In addition, in the present disclosure, the display moment of each frame of image may be determined first, and then the image is rendered at a moment preceding the display moment by the interval duration. As an example, the interval duration is 30 ms, and one frame of image is displayed at 9:00+30 ms, then the step of the present disclosure starts to be performed when the moment reaches 9:00, so as to complete the rendering of the image before 9:00+30 ms.

The present disclosure can accurately determine, at the current moment, the intermediate moments between the display moment and the current moment, so as to subsequently determine the pose at the display moment.

S202: inputting the plurality of predicted moments into a pre-trained prediction model for prediction processing to obtain a plurality of predicted inertial measurement data.

Specifically, in the prediction model, conversion processing is performed on the plurality of predicted moments according to a moment sequence to obtain corresponding sequence identifiers. For example, when the predicted moments are 9:00+1 ms, 9:00+2 ms, . . . , 9:00+29 ms, and 9:00+30 ms, then the corresponding sequence identifiers are obtained as 1, 2, 3, 4, . . . , 30, wherein the predicted moments correspond to the sequence identifiers on a one-to-one basis.

Further, the prediction processing is performed on the sequence identifiers by the prediction model to obtain the predicted inertial measurement data that correspond to the predicted moments on a one-to-one basis. For example, when the predicted moments are 9:00+1 ms, 9:00+2 ms, . . . , 9:00+29 ms, and 9:00+30 ms, then the predicted inertial measurement data at 9:00+1 ms, the predicted inertial measurement data at 9:00+2 ms, . . . , the predicted inertial measurement data at 9:00+29 ms, and the predicted inertial measurement data at 9:00+30 ms are obtained.

In the present disclosure, the predicted inertial measurement data includes: an angular speed and a linear acceleration. Herein, the predicted inertial measurement data at the current moment may be acquired by an Inertial Measurement Unit (IMU) of the head-mounted display device, wherein the IMU includes a gyroscope and a linear accelerometer, wherein the gyroscope is capable of acquiring the angular speed of the head-mounted display device, and the linear accelerometer is capable of acquiring the linear acceleration of the head-mounted display device.

In addition, the prediction model in the present disclosure is a learning model that may be implemented using at least one algorithm such as wavelet filtering algorithm, FFT (fast Fourier transform), Kalman (Kalman filtering algorithm), Wiener filtering, federal filtering, primary linear fitting, secondary linear fitting, moment sequencing, SVMs (Support Vector Machines), Convolutional Neural Networks, etc., which are not limited herein.

In an embodiment of the present application, prior to determining a plurality of predicted moments after a current moment, the method further comprises: obtaining a plurality of historical inertial measurement data; determining historical moments corresponding to the historical inertial measurement data; and determining a plurality of the historical moments as input data of the prediction model, and the plurality of historical inertial measurement data as label data of the prediction model, and training the prediction model to obtain a trained prediction model.

Specifically, the prediction model is a pre-trained model, that is, the pre-trained model of the prediction model may be obtained by performing pre-training, and then it is adjusted and trained in real time during use.

Herein, in the pre-training process of the prediction model, a plurality of inertial measurement data are obtained from actual measurement, the plurality of inertial measurement data have a moment sequence, and the plurality of inertial measurement data are grouped to obtain a plurality of groups of inertial measurement data. The plurality of groups of inertial measurement data are regarded as labels, and the moment sequence is identified as input to the model, thereby performing the pre-training of the prediction model. For example, there includes a plurality of inertial measurement data within 1 s to 2 s, where there is an inertial measurement data at each millisecond, and then there include 1000 inertial measurement data within 1 s to 2 s; the 1000 inertial measurement data are divided into 200 groups, each group having 50 inertial measurement data, which are regarded as a label. Then one pre-training is to input 1 to 50 into the prediction model, output the predicted inertial measurement data, and adjust the pre-trained model by using the predicted inertial measurement data and a loss value of the label. The purpose of the pre-training process is to learn the variation relationship of the inertial measurement data over the moment sequence.

Further, during use of the present disclosure, the pre-trained prediction model described above may be adjusted and trained in real time using the historical inertial measurement data, so as to obtain a trained prediction model for determining the predicted inertial measurement data at the display moment.

In an embodiment of the present application, a prediction model may also be directly trained using the historical inertial measurement data, so as to obtain a trained prediction model for determining the prediction inertial measurement data at the display moment. In the present application, the ways in which the prediction model is trained are not limited.

Figure 3:
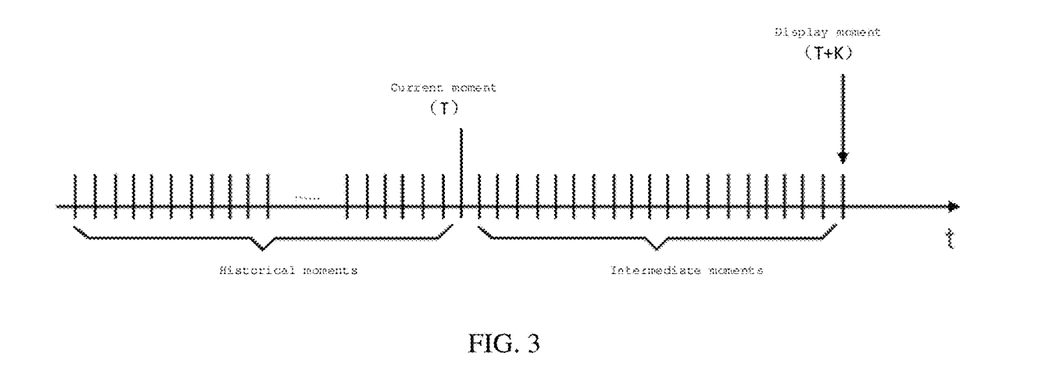
FIG. 3 is a schematic diagram of a model training process provided in an embodiment of the present disclosure.

As an example, referring to FIG. 3, a current moment is T, a display moment of an image is (T+K), and then a historical moment period may be T−n to T, where n is an integer greater than or equal to 1. Herein, historical inertial measurement data between T−n, T−(n−1), . . . and T may be used to adjust and train the prediction model. For example, T is 9:00, if n is 30 ms, 9:00-29 ms, 9:00-28 ms, 9:00-27 ms, . . . , are used, with T as the input, and the corresponding historical inertial measurement data as label data, to adjust and train the prediction model. The adjusted prediction model may be used for subsequent prediction of the predicted inertial measurement data from the current moment to the display moment.

In an embodiment of the present application, predicted inertial measurement data at a future moment can be accurately predicted.

S203: obtaining a current pose and a current speed of the head-mounted display device, and determining a display pose at the display moment based on the current pose, the current speed and the plurality of predicted inertial measurement data.

In an optional embodiment, a display pose at a display moment is determined based on a current pose and a current speed by adopting an integration operation. As an example, if the current moment is 9:00, then the pose and the speed at 9:00 are obtained, the pose A and the speed a at 9:00+1 ms may be determined using the pose and the speed at 9:00 and the predicted inertial measurement data at 9:00+1 ms, the pose B and the speed b at 9:00+3 ms may be determined using the pose A and the speed a and the predicted inertial measurement data at 9:00+2 ms, and by analogy, the pose at 9:00+30 ms may be determined.

Further, determining a display pose at the display moment based on the current pose, the current speed and the plurality of predicted inertial measurement data comprises: obtaining current inertial measurement data; and performing, by adopting an integration operation, integration processing on the current pose and the current speed based on the plurality of predicted inertial measurement data and the current inertial measurement data to obtain the display pose.

In another optional embodiment, the predicted inertial measurement data include: an angular speed and a linear acceleration; performing, by adopting an integration operation, integration processing on the current pose and the current speed based on the plurality of predicted inertial measurement data and the current inertial measurement data to obtain the display pose comprises: obtaining a preset angular speed deviation and a preset linear speed deviation; and performing, by adopting the integration operation, the integration processing on the current pose and the current speed based on the plurality of predicted inertial measurement data, the angular speed deviation and the linear speed deviation, and the current inertial measurement data to obtain the display pose.

Further, a moving speed of the head-mounted display device at the display moment may also be obtained.

Herein, the angular speed deviation and the linear speed deviation are preset. The angular speed deviation and the linear speed deviation may be added in each operation. As an example, if the current moment is 9:00, the pose at 9:00 is obtained, the pose C and the speed c at 9:00+1 ms may be determined using the pose and the speed at 9:00, the predicted inertial measurement data at 9:00+1 ms, and the angular speed deviation and the linear speed deviation, the pose D and the speed d at 9:00+3 ms may be determined using the pose C and the speed c, the predicted inertial measurement data at 9:00+2 ms, and the angular speed deviation and the linear speed deviation, and by analogy, the pose at 9:00+30 ms may be determined, wherein the speed here refers to a moving and/or rotating speed of the head-mounted display device.

In an embodiment of the present application, the display pose at the display moment may be determined more accurately by adopting the integration operation, with consideration of the angular speed deviation and the linear speed deviation.

S204: rendering a virtual scene based on the display pose to obtain a display picture corresponding to the display moment.

In the present disclosure, the display pose at the display moment is predicted, and the virtual scene to be displayed at the display moment is rendered by using the display pose, enabling a GPU (graphics processing unit, graphics rendering unit) to accurately render the virtual scene to be displayed in the future or a part of the current virtual scene to be displayed in the future in advance, whereby the rendered pictures reduce the dizziness of users' eyes after viewing.

The picture rendering method and apparatus provided in the embodiments, by determining a plurality of predicted moments after a current moment, wherein the plurality of predicted moments comprise a plurality of intermediate moments and a display moment after the plurality of intermediate moments; inputting the plurality of predicted moments into a pre-trained prediction model for prediction processing to obtain a plurality of predicted inertial measurement data that correspond to the predicted moments on a one-to-one basis; obtaining a current pose and a current speed of a head-mounted display device, and determining a display pose at the display moment based on the current pose, the current speed and the plurality of predicted inertial measurement data; and rendering a virtual scene based on the display pose to obtain a display picture corresponding to the display moment, can accurately determine the display pose at the display moment and render the virtual scene based on the display pose to obtain the display picture that is accurately displayed at the display moment, thereby avoiding the dizziness of users when viewing pictures and improving the user experience.

Figure 4:
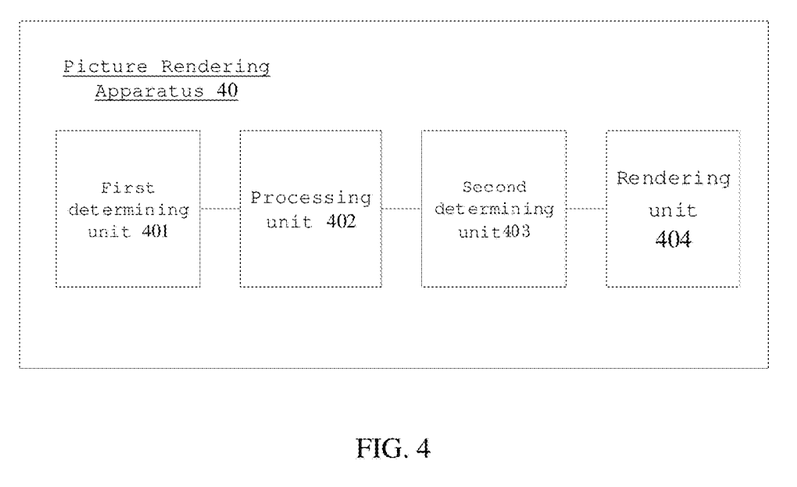
FIG. 4 is a structural block diagram of a picture rendering apparatus provided in an embodiment of the present disclosure.

FIG. 4 is a structural block diagram of a picture rendering apparatus 40 provided in an embodiment of the present disclosure, corresponding to the picture rendering method in the embodiment described above. For ease of illustration, only portions relevant to the embodiment of the present disclosure are shown. As shown in FIG. 4, the picture rendering apparatus 40 specifically comprises: a first determining unit 401, a processing unit 402, a second determining unit 403, and a rendering unit 404, wherein:

the first determining unit 401 is configured to determine a plurality of predicted moments after a current moment, wherein the plurality of predicted moments comprise a plurality of intermediate moments and a display moment after the plurality of intermediate moments;

the processing unit 402 is configured to input the plurality of predicted moments into a pre-trained prediction model for prediction processing to obtain a plurality of predicted inertial measurement data that correspond to the predicted moments on a one-to-one basis;

the second determining unit 403 is configured to obtain a current pose and a current speed of a head-mounted display device, and determine a display pose at the display moment based on the current pose, the current speed, and the plurality of predicted inertial measurement data;

the rendering unit 404 is configured to render a virtual scene based on the display pose to obtain a display picture corresponding to the display moment.

In some embodiments, there further comprise a training unit (not shown), which is specifically configured to obtain a plurality of historical inertial measurement data prior to determining a plurality of predicted moments after a current moment; determine historical moments corresponding to the historical inertial measurement data; and determine the plurality of historical moments as input data of the prediction model, and the plurality of historical inertial measurement data as label data of the prediction model, and train the prediction model to obtain a trained prediction model.

In some embodiments, the second determining unit 403 is specifically configured to: obtain current inertial measurement data; and perform, by adopting an integration operation, integration processing on the current pose and the current speed based on the plurality of predicted inertial measurement data and the current inertial measurement data to obtain a display pose.

In some embodiments, the predicted inertial measurement data include: an angular speed and a linear acceleration; the second determining unit 403 is specifically configured to: obtain a preset angular speed deviation and a preset linear speed deviation; and perform, by adopting the integration operation, the integration processing on the current pose and the current speed based on the plurality of predicted inertial measurement data, the angular speed deviation and the linear speed deviation, and the current inertial measurement data, to obtain a display pose.

In some embodiments, the first determining unit 401 is specifically configured to obtain a display moment; and determine a plurality of intermediate moments between the current moment and the display moment.

In some embodiments, the first determining unit 401 is specifically configured, at the time of obtaining the display moment, to obtain, an interval duration between the display moment and the current moment; and determine the display moment based on a picture rendering duration and the current moment.

In some embodiments, the first determining unit 401 is specifically configured, at the time of obtaining the interval duration between the display moment and the current moment, to determine a virtual scene type; and determine the interval duration based on the virtual scene type, wherein the virtual scene type and the interval duration have a preset correspondence.

In some embodiments, the first determining unit 401 is specifically configured, at the time of obtaining the interval duration between the display moment and the current moment, to obtain a picture display frame rate; and determine the interval duration based on the picture display frame rate, wherein the picture display frame rate and the interval duration are positively correlated.

In some embodiments, the first determining unit 401 is specifically configured, at the time of obtaining the interval duration between the display moment and the current moment, to obtain a historical picture rendering duration within a preset historical moment period; and determine the interval duration based on the historical picture rendering duration, wherein the interval duration is greater than or equal to the historical picture rendering duration.

The picture rendering apparatus provided in the embodiment can be used to implement the technical solution in the embodiment of the picture rendering method, and its implementation principle and technical effect are similar, which are not described herein again in this embodiment.

Figure 5:
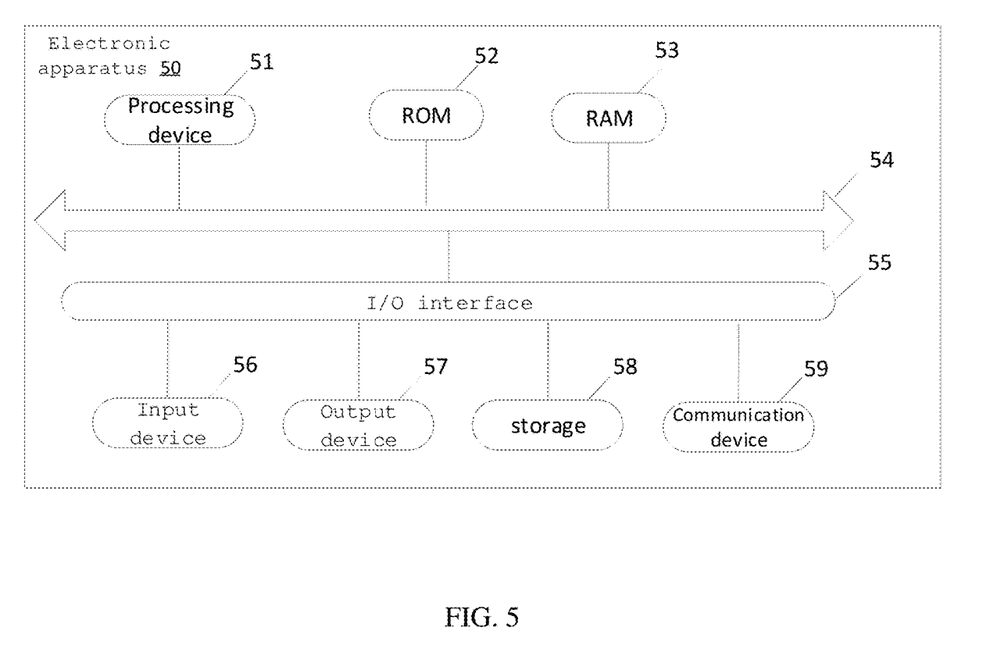
FIG. 5 is a hardware structure schematic diagram of an electronic apparatus provided in an embodiment of the present disclosure.

Referring to FIG. 5, it is a structural schematic diagram of an electronic apparatus 50 suitable for implementing the embodiments of the present disclosure. The electronic apparatus 50 may be a terminal device or a server, wherein the terminal device may include, but is not limited to, a mobile terminal such as a mobile phone, a laptop computer, a digital broadcast receiver, a Personal Digital Assistant (shortly referred to as PDA), a tablet computer (Portable Android Device, shortly referred to as PAD), a Portable Multimedia Player (shortly referred to as PMP), an in-vehicle terminal (e.g., an in-vehicle navigation terminal), etc., and a fixed terminal such as a Digital TV, a desktop computer, etc. The electronic apparatus shown in FIG. 5 is only an example, which should not bring any limitation to the functions and the scope of use of the embodiments of the present disclosure.

As shown in FIG. 5, the electronic apparatus 50 may comprise processing device (e.g., a central processing unit, a graphics processing unit, etc.) 51, which may perform various suitable actions and processes according to a program stored in a Read Only Memory (shortly referred to as ROM) 52 or a program loaded from storage 58 into a Random Access Memory (shortly referred to as RAM) 53. In the RAM 53, various programs and data necessary for operations of the electronic apparatus 50 are also stored. The processing device 51, the ROM 52, and the RAM 53 are connected to each other via a bus 54. An input/output (I/O) interface 55 is also connected to the bus 54.

Generally, the following devices may be connected to the I/O interface 55: input device 56 including, for example, a touch screen, a touch pad, a keyboard, a mouse, a camera, a microphone, an accelerometer, a gyroscope, etc.; output device 57 including, for example, a Liquid Crystal Display (shortly referred to as LCD), a speaker, a vibrator, etc.; storage 58 including, for example, a magnetic tape, a hard disk, etc.; and communication device 59. The communication device 59 may allow the electronic apparatus 50 to communicate with other devices in a wireless or wired manner to exchange data. While FIG. 5 illustrates an electronic apparatus 50 having various devices, it is to be understood that not all illustrated devices are required to be implemented or provided. More or fewer devices may be alternatively implemented or provided.

In particular, the process described above with reference to the flowchart may be implemented as a computer software program, according to the embodiments of the present disclosure. For example, an embodiment of the present disclosure comprises a computer program product comprising a computer program carried on a computer-readable medium, which embodies s program code for performing the method shown by the flowchart therein. In such an embodiment, the computer program may be downloaded and installed from a network via the communication device 59, or installed from the storage 58, or installed from the ROM 52. The computer program, when executed by the processing device 51, performs the above-described functions defined in the method in the embodiment of the present disclosure.

It should be noted that the computer readable medium described above in the present disclosure may be a computer readable signal medium or a computer readable storage medium or any combination of the two. The computer readable storage medium may be, for example, but not limited to, an electronic, magnetic, optical, electromagnetic, infrared, or semiconductor system, apparatus, or device, or any combination of the foregoing. More specific examples of the computer readable storage medium may include, but are not limited to: an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium that can embody, or store a program for use by or in connection with an instruction execution system, apparatus, or device. In contrast, in the present disclosure, the computer readable signal medium may include a propagated data signal with computer readable program code embodied therein in baseband or as part of a carrier wave. Such a propagated data signal may take a variety of forms, including, but not limited to, an electro-magnetic signal, an optical signal, or any suitable combination thereof. The computer readable signal medium may be any computer readable medium that is not a computer readable storage medium and that can communicate, propagate, or transport a program for use by or in connection with an instruction execution system, apparatus, or device. The program code embodied on the computer readable medium may be transmitted using any appropriate medium, including but not limited to: electrical wires, optical cables, radio frequency (RF), etc., or any suitable combination of the foregoing.

The computer readable medium may be embodied in the electronic apparatus described above; or may be separate and not incorporated into the electronic apparatus.

The computer readable medium carries one or more programs which when executed by the electronic apparatus cause the electronic apparatus to perform the method shown in the above embodiments.

Computer program code for carrying out operations in the present disclosure can be written in one or more programming languages or combinations thereof, the programming languages including object oriented programming languages such as Java, Smalltalk, C++, and further including conventional procedural programming languages, such as the "C" programming language or similar programming languages. The program code can be executed entirely on a user's computer, partly on the user's computer, as a stand-alone software package, partly on the user's computer and partly on a remote computer or entirely on the remote computer or server. In the scenario involving the remote computer, the remote computer can be connected to the user's computer through any type of network, including a Local Area Network (shortly referred to as LAN) or a Wide Area Network (shortly referred to as WAN), or can be connected to an external computer (for example, through the Internet using an Internet service provider).

The flowchart and block diagrams in the figures illustrate the architecture, functionality, and operation of possible implementations of systems, methods and computer program products according to various embodiments of the present disclosure. In this regard, each block in the flowchart or block diagrams may represent a unit, program segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or sometimes in the reverse order, depending upon the functionality involved. It will also be noted that each block in the block diagrams and/or flowchart, and combinations of the blocks in the block diagrams and/or flowchart can be implemented by special purpose hardware-based systems that perform the specified functions or operations, or by combinations of special purpose hardware and computer instructions.

The units described in the embodiments of the present disclosure can be implemented by software or hardware, wherein the name of a unit does not in some cases constitute a limitation on the unit itself.

The functions described herein above can be performed, at least in part, by one or more hardware logic components. For example, without limitation, exemplary types of hardware logic components that can be used include: Field Programmable Gate Arrays (FPGAs), Application Specific Integrated Circuits (ASICs), Application Specific Standard Parts (ASSPs), Systems On Chip (SOCs), Complex Programmable Logic Devices (CPLDs), and the like.

In the context of the present disclosure, a machine-readable medium may be a tangible medium that can contain, or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection based on one or more wires, a portable computer diskette, a hard disk, a Random Access Memory (RAM), a Read-Only Memory (ROM), an Erasable Programmable Read-Only Memory (EPROM, flash Memory), an optical fiber, a Compact Disc Read-Only Memory (CD-ROM), an optical storage device, a magnetic storage device, or any suitable combination of the foregoing.

In a first aspect, according to one or more embodiments of the present disclosure, is provided a picture rendering method, which is applied to a head-mounted display device, the picture rendering method comprising: determining a plurality of predicted moments after a current moment, wherein the plurality of predicted moments comprise a plurality of intermediate moments and a display moment after the plurality of intermediate moments; inputting the plurality of predicted moments into a pre-trained prediction model for prediction processing to obtain a plurality of predicted inertial measurement data that correspond to the predicted moments on a one-to-one basis; obtaining a current pose and a current speed of the head-mounted display device, and determining a display pose at the display moment based on the current pose, the current speed and the plurality of predicted inertial measurement data; rendering a virtual scene based on the display pose to obtain a display picture corresponding to the display moment.

According to one or more embodiments of the present disclosure, prior to determining a plurality of predicted moments after a current moment, the method further comprises: obtaining a plurality of historical inertial measurement data; determining historical moments corresponding to the historical inertial measurement data; and determining a plurality of the historical moments as input data of the prediction model, and the plurality of historical inertial measurement data as label data of the prediction model, and training the prediction model to obtain a trained prediction model.

According to one or more embodiments of the present disclosure, determining a display pose at the display moment based on the current pose, the current speed and the plurality of predicted inertial measurement data comprises: obtaining current inertial measurement data; and performing, by adopting an integration operation, integration processing on the current pose and the current speed based on the plurality of predicted inertial measurement data and the current inertial measurement data to obtain the display pose.

According to one or more embodiments of the present disclosure, the predicted inertial measurement data include: an angular speed and a linear acceleration; performing, by adopting an integration operation, integration processing on the current pose and the current speed based on the plurality of predicted inertial measurement data and the current inertial measurement data to obtain the display pose comprises: obtaining a preset angular speed deviation and a preset linear speed deviation; and performing, by adopting the integration operation, the integration processing on the current pose and the current speed based on the plurality of predicted inertial measurement data, the angular speed deviation and the linear speed deviation, and the current inertial measurement data to obtain the display pose.

According to one or more embodiments of the present disclosure, determining a plurality of predicted moments after a current moment comprises: obtaining a display moment; determining a plurality of intermediate moments between the current moment and the display moment.

According to one or more embodiments of the present disclosure, obtaining a display moment comprises: obtaining an interval duration between the display moment and the current moment; and determining the display moment based on a picture rendering duration and the current moment.

According to one or more embodiments of the present disclosure, obtaining an interval duration between the display moment and the current moment comprises: determining a virtual scene type; and determining the interval duration according to the virtual scene type, wherein the virtual scene type and the interval duration have a preset correspondence.

According to one or more embodiments of the present disclosure, obtaining an interval duration between the display moment and the current moment comprises: obtaining a picture display frame rate; and determining the interval duration according to the picture display frame rate, wherein the picture display frame rate and the interval duration are positively correlated.

According to one or more embodiments of the present disclosure, obtaining an interval duration between the display moment and the current moment comprises: obtaining a historical picture rendering duration within a preset historical moment period; and determining the interval duration according to the historical picture rendering duration, wherein the interval duration is greater than or equal to the historical picture rendering duration.

In a second aspect, according to one or more embodiments of the present disclosure, is provided a picture rendering apparatus, comprising:
  a first determining unit configured to determine a plurality of predicted moments after a current moment, wherein the plurality of predicted moments comprise a plurality of intermediate moments and a display moment after the plurality of intermediate moments;
  a processing unit configured to input the plurality of predicted moments into a pre-trained prediction model for prediction processing to obtain a plurality of predicted inertial measurement data that correspond to the predicted moments on a one-to-one basis;
  a second determining unit configured to obtain a current pose and a current speed of a head-mounted display device, and determine a display pose at the display moment based on the current pose, the current speed and the plurality of predicted inertial measurement data; and
  a rendering unit configured to render a virtual scene based on the display pose to obtain a display picture corresponding to the display moment.

In a third aspect, according to one or more embodiments of the present disclosure, is provided an electronic apparatus, comprising: at least one processor and a memory;
  wherein the memory stores computer executable instructions; and
  wherein the at least one processor executes the computer executable instructions stored in the memory, so that the at least one processor performs the picture rendering method as provided above in the first aspect.

In a fourth aspect, according to one or more embodiments of the present disclosure, is provided a computer readable storage medium storing computer executable instructions thereon, which when executed by a processor implement the picture rendering method as provided above in the first aspect.

In a fifth aspect, according to one or more embodiments of the present disclosure, is provided a computer program product that embodies computer executable instructions therein, which when executed by a processor implement the picture rendering method as provided above in the first aspect.

The foregoing description is only exemplary of the preferred embodiments of the disclosure and is illustrative of the principles of the technology employed. It will be appreciated by those skilled in the art that the scope of the disclosure herein is not limited to the particular combination of features described above, but also encompasses other r combinations of features described above or equivalents thereof without departing from the spirit of the disclosure. For example, the above features and the technical features disclosed in the present disclosure (but not limited to) having similar functions are replaced with each other to form the technical solution.

Further, while operations are depicted in a particular order, this should not be understood as requiring that such operations be performed in the particular order shown or in sequential order. Under certain circumstances, multitasking and parallel processing may be advantageous. Likewise, while several specific implementation details are included in the above discussion, these should not be construed as limitations on the scope of the disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A picture rendering method, which is applied to a head-mounted display device, the picture rendering method comprising:
    determining a plurality of predicted moments after a current moment, wherein the plurality of predicted moments comprise a plurality of intermediate moments and a display moment after the plurality of intermediate moments;
    inputting the plurality of predicted moments into a pre-trained prediction model for prediction processing to obtain a plurality of predicted inertial measurement data that correspond to the predicted moments on a one-to-one basis;
    obtaining a current pose and a current speed of the head-mounted display device, and determining a display pose at the display moment based on the current pose, the current speed and the plurality of predicted inertial measurement data; and
    rendering a virtual scene based on the display pose to obtain a display picture corresponding to the display moment.

2. The picture rendering method according to claim 1, prior to the determining a plurality of predicted moments after a current moment, further comprising:
    obtaining a plurality of historical inertial measurement data;
    determining historical moments corresponding to the historical inertial measurement data; and
    determining a plurality of the historical moments as input data of the prediction model, and the plurality of historical inertial measurement data as label data of the prediction model, and training the prediction model to obtain a trained prediction model.

3. The picture rendering method according to claim 1, wherein the determining a display pose at the display moment based on the current pose, the current speed and the plurality of predicted inertial measurement data comprises:
    obtaining current inertial measurement data; and
    performing, by adopting an integration operation, integration processing on the current pose and the current speed based on the plurality of predicted inertial measurement data and the current inertial measurement data to obtain the display pose.

4. The picture rendering method according to claim 3, wherein the predicted inertial measurement data include: an angular speed and a linear acceleration; and wherein performing, by adopting an integration operation, integration processing on the current pose and the current speed based on the plurality of predicted inertial measurement data and the current inertial measurement data to obtain the display pose comprises:
    obtaining a preset angular speed deviation and a preset linear speed deviation; and
    performing, by adopting the integration operation, the integration processing on the current pose and the current speed based on the plurality of predicted inertial measurement data, the angular speed deviation and the linear speed deviation, and the current inertial measurement data to obtain the display pose.

5. The picture rendering method according to claim 1, wherein the determining a plurality of predicted moments after a current moment comprises:
    obtaining the display moment; and
    determining a plurality of intermediate moments between the current moment and the display moment.

6. The picture rendering method according to claim 5, wherein the obtaining the display moment comprises:
    obtaining an interval duration between the display moment and the current moment; and
    determining the display moment based on the interval duration and the current moment.

7. The picture rendering method according to claim 6, wherein the obtaining an interval duration between the display moment and the current moment comprises:
    determining a virtual scene type; and
    determining the interval duration according to the virtual scene type, wherein the virtual scene type and the interval duration have a preset correspondence.

8. The picture rendering method according to claim 6, wherein the obtaining an interval duration between the display moment and the current moment comprises:
    obtaining a picture display frame rate; and
    determining the interval duration according to the picture display frame rate, wherein the picture display frame rate and the interval duration are positively correlated.

9. The picture rendering method according to claim 6, wherein the obtaining an interval duration between the display moment and the current moment comprises:
    obtaining a historical picture rendering duration within a preset historical moment period; and
    determining the interval duration according to the historical picture rendering duration, wherein the interval duration is greater than or equal to the historical picture rendering duration.

10. An electronic apparatus, comprising: at least one processor and a memory;
    wherein the memory stores computer executable instructions; and
    wherein the at least one processor executes the computer executable instructions stored in the memory, causing the at least one processor to:

determine a plurality of predicted moments after a current moment, wherein the plurality of predicted moments comprise a plurality of intermediate moments and a display moment after the plurality of intermediate moments;

input the plurality of predicted moments into a pre-trained prediction model for prediction processing to obtain a plurality of predicted inertial measurement data that correspond to the predicted moments on a one-to-one basis;

obtain a current pose and a current speed of the head-mounted display device, and determining a display pose at the display moment based on the current pose, the current speed and the plurality of predicted inertial measurement data; and render a virtual scene based on the display pose to obtain a display picture corresponding to the display moment.

11. The electronic apparatus according to claim 10, prior to the determining a plurality of predicted moments after a current moment, the computer executable instructions further causing the at least one processor to:

obtain a plurality of historical inertial measurement data;
determine historical moments corresponding to the historical inertial measurement data; and
determine a plurality of the historical moments as input data of the prediction model, and the plurality of historical inertial measurement data as label data of the prediction model, and training the prediction model to obtain a trained prediction model.

12. The electronic apparatus according to claim 10, wherein the computer executable instructions for determining a display pose at the display moment based on the current pose, the current speed and the plurality of predicted inertial measurement data further causes the at least one processor to:

obtain current inertial measurement data; and
perform, by adopting an integration operation, integration processing on the current pose and the current speed based on the plurality of predicted inertial measurement data and the current inertial measurement data to obtain the display pose.

13. The electronic apparatus according to claim 12, wherein the predicted inertial measurement data include: an angular speed and a linear acceleration; and wherein the computer executable instructions for performing, by adopting an integration operation, integration processing on the current pose and the current speed based on the plurality of predicted inertial measurement data and the current inertial measurement data to obtain the display pose further causes the at least one processor to:

obtain a preset angular speed deviation and a preset linear speed deviation; and
perform, by adopting the integration operation, the integration processing on the current pose and the current speed based on the plurality of predicted inertial measurement data, the angular speed deviation and the linear speed deviation, and the current inertial measurement data to obtain the display pose.

14. The electronic apparatus according to claim 10, wherein the computer executable instructions for determining a plurality of predicted moments after a current moment further causes the at least one processor to:

obtain the display moment; and
determine a plurality of intermediate moments between the current moment and the display moment.

15. The electronic apparatus according to claim 14, wherein computer executable instructions for obtaining the display moment further causes the at least one processor to:

obtain an interval duration between the display moment and the current moment; and
determine the display moment based on the interval duration and the current moment.

16. A non-transitory computer readable storage medium storing computer executable instructions thereon, which when executed by a processor implement the picture rendering method comprising:

determining a plurality of predicted moments after a current moment, wherein the plurality of predicted moments comprise a plurality of intermediate moments and a display moment after the plurality of intermediate moments;

inputting the plurality of predicted moments into a pre-trained prediction model for prediction processing to obtain a plurality of predicted inertial measurement data that correspond to the predicted moments on a one-to-one basis;

obtaining a current pose and a current speed of the head-mounted display device, and determining a display pose at the display moment based on the current pose, the current speed and the plurality of predicted inertial measurement data; and rendering a virtual scene based on the display pose to obtain a display picture corresponding to the display moment.

17. The non-transitory computer readable storage medium according to claim 16, prior to the determining a plurality of predicted moments after a current moment, further comprising:

obtaining a plurality of historical inertial measurement data;
determining historical moments corresponding to the historical inertial measurement data; and
determining a plurality of the historical moments as input data of the prediction model, and the plurality of historical inertial measurement data as label data of the prediction model, and training the prediction model to obtain a trained prediction model.

18. The non-transitory computer readable storage medium according to claim 16, wherein the determining a display pose at the display moment based on the current pose, the current speed and the plurality of predicted inertial measurement data comprises:

obtaining current inertial measurement data; and
performing, by adopting an integration operation, integration processing on the current pose and the current speed based on the plurality of predicted inertial measurement data and the current inertial measurement data to obtain the display pose.

19. The non-transitory computer readable storage medium according to claim 18, wherein the predicted inertial measurement data include: an angular speed and a linear acceleration; and wherein performing, by adopting an integration operation, integration processing on the current pose and the current speed based on the plurality of predicted inertial measurement data and the current inertial measurement data to obtain the display pose comprises:

obtaining a preset angular speed deviation and a preset linear speed deviation; and
performing, by adopting the integration operation, the integration processing on the current pose and the current speed based on the plurality of predicted inertial measurement data, the angular speed deviation and the linear speed deviation, and the current inertial measurement data to obtain the display pose.

20. The non-transitory computer readable storage medium according to claim 16, wherein the determining a plurality of predicted moments after a current moment comprises:
   obtaining the display moment; and
   determining a plurality of intermediate moments between the current moment and the display moment.

* * * * *